(12) United States Patent
Trescott

(10) Patent No.: US 7,643,063 B2
(45) Date of Patent: Jan. 5, 2010

(54) DUAL LOOP STABILIZATION OF VIDEO CAMERA IMAGES

(75) Inventor: Patrick J. Trescott, Everett, WA (US)

(73) Assignee: The Boeing Company, Chicago, IL (US)

( * ) Notice: Subject to any disclaimer, the term of this patent is extended or adjusted under 35 U.S.C. 154(b) by 411 days.

(21) Appl. No.: 11/618,660

(22) Filed: Dec. 29, 2006

(65) Prior Publication Data

US 2008/0158371 A1   Jul. 3, 2008

(51) Int. Cl.
*H04N 5/228* (2006.01)

(52) U.S. Cl. .............................. 348/208.5; 348/208.99

(58) Field of Classification Search ............. 348/208.7, 348/113–161, 184–185, 208.99, 208.1–208.14; 396/13, 55
See application file for complete search history.

(56) References Cited

U.S. PATENT DOCUMENTS

| | | | | |
|---|---|---|---|---|
| 3,582,180 | A * | 6/1971 | Gross | 359/555 |
| 4,498,038 | A * | 2/1985 | Malueg | 318/648 |
| 4,736,218 | A * | 4/1988 | Kutman | 396/427 |
| 4,959,725 | A * | 9/1990 | Mandle | 348/208.6 |
| 4,989,466 | A * | 2/1991 | Goodman | 74/5.22 |
| 5,053,876 | A * | 10/1991 | Blissett et al. | 348/208.14 |
| 5,465,924 | A * | 11/1995 | Schneider | 244/118.1 |
| 5,627,616 | A * | 5/1997 | Sergeant et al. | 396/427 |
| 5,699,112 | A * | 12/1997 | Bacs, Jr. | 348/208.2 |
| 5,897,223 | A * | 4/1999 | Tritchew et al. | 396/13 |
| 6,484,978 | B2 * | 11/2002 | Voigt et al. | 248/182.1 |
| 6,527,238 | B2 * | 3/2003 | Shental et al. | 248/276.1 |
| 6,542,181 | B1 * | 4/2003 | Houska et al. | 348/144 |
| 6,611,662 | B1 * | 8/2003 | Grober | 396/55 |
| 7,046,259 | B2 | 5/2006 | Humphries | |
| 7,088,310 | B2 | 8/2006 | Sanford | |
| 7,128,705 | B2 * | 10/2006 | Brendley et al. | 600/27 |
| 7,162,056 | B2 * | 1/2007 | Burl et al. | 382/104 |
| 7,365,774 | B2 * | 4/2008 | Louis | 348/219.1 |
| 7,380,951 | B2 * | 6/2008 | Plaster | 359/857 |
| 7,440,008 | B2 * | 10/2008 | Lai et al. | 348/208.99 |
| 2003/0210329 | A1 * | 11/2003 | Aagaard et al. | 348/159 |
| 2004/0183917 | A1 * | 9/2004 | von Flotow et al. | 348/208.99 |
| 2005/0134440 | A1 * | 6/2005 | Breed | 340/435 |
| 2005/0174498 | A1 * | 8/2005 | Wu | 348/837 |
| 2006/0017815 | A1 * | 1/2006 | Stavely et al. | 348/208.7 |
| 2006/0125921 | A1 * | 6/2006 | Foote | 348/159 |
| 2006/0251410 | A1 * | 11/2006 | Trutna, Jr. | 396/55 |

* cited by examiner

*Primary Examiner*—Tuan Ho
*Assistant Examiner*—Don Nguyen
(74) *Attorney, Agent, or Firm*—Toler Law Group

(57) ABSTRACT

Dual loop stabilization of video images is disclosed. In one embodiment, an apparatus includes a video camera having a first image stability control component configured to stabilize a video image in a first motion environment. A second image stability control component is coupled between the video camera and a moveable platform and is configured to stabilize the video image in a second motion environment. A motion sensing device detects movement of the video camera and transmits a control signal to adjust a stabilization response of the second image stability control component according to the movement. In some embodiments, a first amplitude range of the first motion environment is at least partially lower than a second amplitude range of the second motion environment, and a first frequency range of the first motion environment is at least partially higher than a second frequency range of the second motion environment.

20 Claims, 6 Drawing Sheets

DUAL LOOP STABILIZATION OF VIDEO CAMERA IMAGES

FIELD OF THE INVENTION

The present invention relates to apparatus and methods for stabilizing a video camera image, and more specifically, to apparatus and methods for providing a dual loop stabilization of a video camera image on a vehicle or other suitable platform.

BACKGROUND OF THE INVENTION

Video cameras have been utilized in an expanded number of applications as the cost of video cameras has steadily decreased. Besides cost, the features included on video cameras, and the quality of the images produced by video cameras, has continued to improve, allowing for expanded use of video cameras in new applications. For example, high definition video cameras are becoming commonplace for general consumer use. Additionally, video cameras are continuing to decrease in size.

Despite the recent improvements in video technology, video cameras still have their drawbacks. For example, video cameras may produce unstable video images when the video camera is mounted in a high movement environment. Despite new technologies, a video image feed from a video camera mounted in an aircraft may have a tendency to make a viewer experience motion sickness because of the video camera's inability to stabilize the high amplitude movements associated with an aircraft in flight.

Therefore, it would be advantageous to provide stabilization of a video camera image to provide an improved viewing experience.

SUMMARY OF THE INVENTION

Embodiments of apparatus and methods for providing a dual loop stabilization of a video camera image are disclosed. Embodiments of apparatus and methods in accordance with the present disclosure may advantageously improve the stability of video images acquired by video cameras mounted on moveable platforms, and may thereby improve viewer satisfaction.

In one embodiment, an apparatus for providing video images using dual loop image stabilization includes a video camera positioned on a moveable platform and configured to provide a video image of a scene, the video camera including a first image stability control component configured to at least partially stabilize the video image when the video camera is subjected to a first motion environment including a first amplitude range and a first frequency range. A second image stability control component is coupled between the video camera and the moveable platform and is configured to at least partially stabilize the video image when the video camera is subjected to a second motion environment including a second amplitude range and a second frequency range. A motion sensing device is coupled to the video camera and configured to detect movement of the video camera relative to the scene and to transmit a control signal to the second image stability control component to adjust a stabilization response of the second image stability control component according to the movement of the video camera. In a particular embodiment, the first amplitude range of the first motion environment is at least partially lower than the second amplitude range of the second motion environment, and the first frequency range of the first motion environment is at least partially higher than the second frequency range of the second motion environment In another embodiment, a method of providing a video image from a moveable platform includes recording a view from the moveable platform using a video camera; stabilizing the video camera with first and second stabilization devices configured to reduce an adverse effect of one or more movements of the moveable platform on the video image; adjusting a frame delivery of the video image to at least partially improve stabilization of the video image; and delivering the video image to a video display.

In a further embodiment, a method of delivering video image stabilization to a viewer includes stabilizing a video image by internal video camera controls; sensing a motion of a video camera; communicating a control signal characteristic of the sensed motion to one or more external video camera controls, the control signal being configured to adjust the external video camera controls to reduce an affect of the sensed motion on the video image; stabilizing the video image by external video camera controls; and distributing the video image to the viewer.

BRIEF DESCRIPTION OF THE DRAWINGS

Embodiments of the present invention are described in detail below with reference to the following drawings.

DETAILED DESCRIPTION

The present invention relates to apparatus and methods for providing a dual loop stabilization of a video camera image. Many specific details of certain embodiments of the invention are set forth in the following description and in FIGS. 1 through 7 to provide a thorough understanding of such embodiments. One skilled in the art, however, will understand that the present invention may have additional embodiments, or that the present invention may be practiced without several of the details described in the following description.

Figure 2:
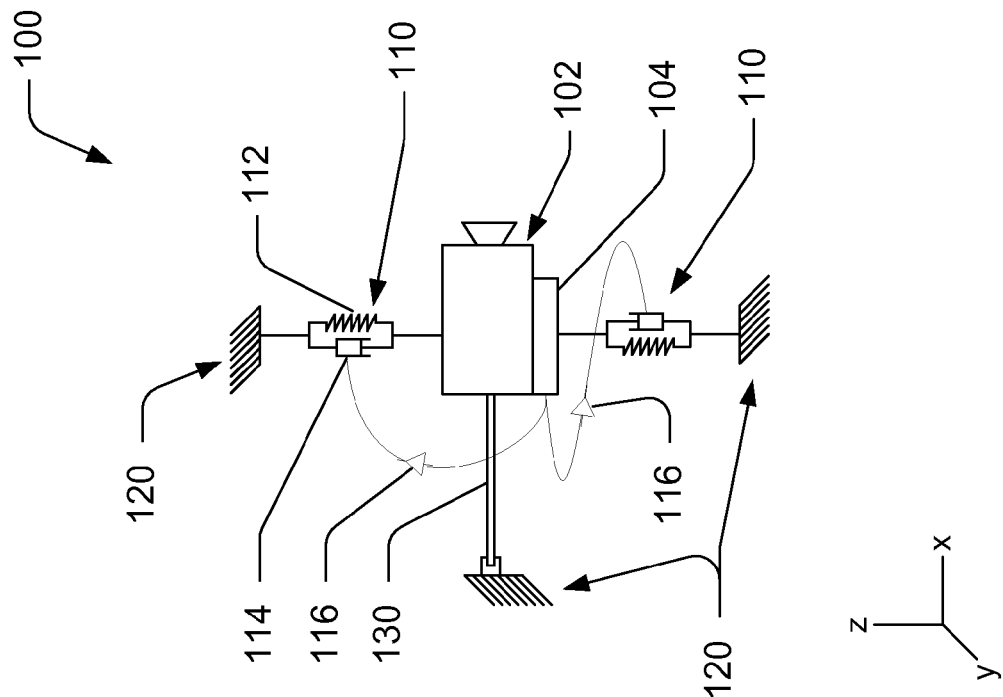
FIG. 2 is a side partial cutaway view of the dual loop stabilization video camera apparatus of FIG. 1.
Figure 1:
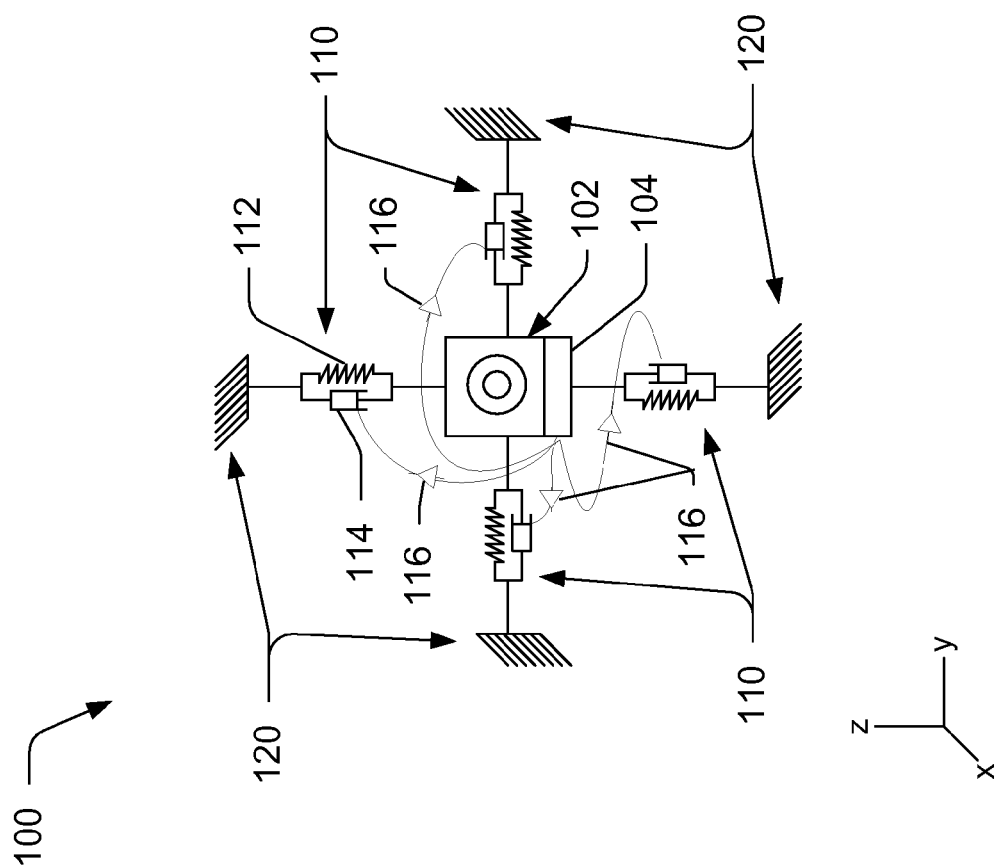
FIG. 1 is a front elevational view of a dual loop stabilization video camera apparatus in accordance with an embodiment of the invention.

FIGS. 1 and 2 illustrate an assembly 100 having video camera 102 in accordance with an embodiment of the present invention. The video camera 102 (or video recorder) may be any suitable type of video capturing device. In some embodiments, for example, the video camera 102 may be a device capable to producing image frames at a rate of 24 Hz or greater, whereas a viewer will receive the image frames as a motion video when the frames are displayed in sequence at a corresponding rate of play, or other acceptable rate of play. In one embodiment, the video camera may have a wide angle lens in order to capture a larger image (area of space) than a standard angle lens.

The video camera 102 typically includes an internal image stabilization apparatus or system (not shown). For example, the video camera 102 may have a digital image stabilization system where the video camera increases the shutter speed and/or ISO-level (reducing sensitivity) in order to remove high frequency, low amplitude movements (or jitters) in the video camera image, such as movements inherent in structure vibration. Additionally, the video camera 102 may have an internal optical image stabilization system. For example, an apparatus may take physical steps to automatically adjust the internal properties of the video camera to stabilize the image from high frequency, low amplitude movements of the video camera 102, thus providing vibration control. Yet another internal image stabilization apparatus or system may include charge-coupled device shifting (CCD-shifting) image stabilization, which is also referred to as anti-shake. CCD-shifting works by moving the video camera's sensor in response to external movement. A counter-movement device moves the CCD in the opposite direction of the video camera movement to produce a stabilized flow of images.

As shown in FIGS. 1 and 2, the assembly 100 also includes a plurality of external image stabilization devices (or systems) 110 for image stabilization. In one embodiment, each external image stabilization device 110 includes a biasing member 112 and a dampening member 114. The biasing member 112 and dampening member 114 may be mounted in parallel (or approximately parallel) to stabilize the video camera 102 from linear motion directed in the same axis as each of the image stabilization devices 110.

During operation, the video camera 102 may experience a force in a linear direction F(x) due to the movement of the video camera's mounting location (e.g., an airplane). For example, a video camera 102 mounted to an aircraft at mounting points 120 may be subjected to airframe movement, air turbulence, and other high or low amplitude movements during flight. One or more of the stabilization devices 110 may then react to the movement of the video camera 102 by applying a counteracting force −F(x) along the same axis. The biasing member 112 and dampening member 114 may work in parallel to apply the opposing force F(x) such that the video camera 102 is substantially stabilized for high amplitude, low frequency movements. Without stabilization of the video camera 102, a viewer may experience motion sickness when watching a video image because the image will likely appear unstable and contain sporadic motion.

The video camera 102 may be coupled to one or more external image stabilization device 110. For example, in a particular embodiment, the video camera 102 may have a stabilization device 110 for each axis or direction of movement by the video camera 102. In some embodiments, there may be four stabilization devices 110, such as where two stabilization devices 110 are situated along the z-axis (yaw axis) and the other two stabilization devices 110 are situated along the y-axis (pitch axis), even though the video camera 102 may be subjected to movement along three axes of space. Stabilization devices 110 may not be necessary along the x-axis (which may be approximately aligned with the line of sight of the video camera 102, as shown in FIG. 2) because the x and y axes (the axes perpendicular to the direction of the line of sight of the video camera 102) may adequately stabilize the image movement. Movement of the video camera along the z-axis may go unnoticed by a viewer because it does not affect the stabilization of the video image. Therefore, an anchor 130 (FIG. 2) coupled to the video camera 102 and oriented along the z-axis may not require a biasing member 112 or dampening member 114 to stabilize the resulting video image.

The stabilization devices 110 may receive an electronic signal 116 from a position sensing device 104 (e.g. a gyro) integrated with the video camera 102. The position sensing device 104 may detect movements of the video camera 102 and then send the electronic signal 116 to one or more of the stabilization devices 110 to counteract the detected movement. For example, the position sensing device 104 may detect high amplitude movements of the video camera 102 and adjust the dampening member 114 to a softer setting, allowing more dampening to occur, and therefore absorbing the shock of larger amplitude movements. Similarly, the sensor may detect lower amplitude movements of the video camera which occur at a higher frequency. In this situation, the position sensing device 104 may adjust the dampening member 114 to a stiffer setting, restraining the range of motion of the dampening member 114, and therefore absorbing the shock of the higher frequency, low amplitude movements more effectively. The position sensing device 104 may also act to stabilize the video camera 102. Position sensing devices 104, such as gyros, are capable of being used to dampen vibration and high frequency, low amplitude movements, including those devices sold by Kenyon Laboratories LLC of Higganum, Conn.

Further, the stabilization device 110 may be mechanically, electrically, or electromechanically biased to stabilize the video camera 102. For example, in a particular embodiment, the stabilization device 110 may include a motor that receives an electrical current to adjust the biasing sensitivity of the stabilization device 110. Further, the stabilization device 110 may need to be tuned to a particular mounting location (e.g., a particular airplane) in order to effectively stabilize the video camera 102 from the unique movement, vibration, and the like, from the mounting location.

The combination of the internal and external image stabilization devices or systems embodies the dual loop stabilization as described herein. Further aspects of the invention are described below in greater detail.

Figure 3:
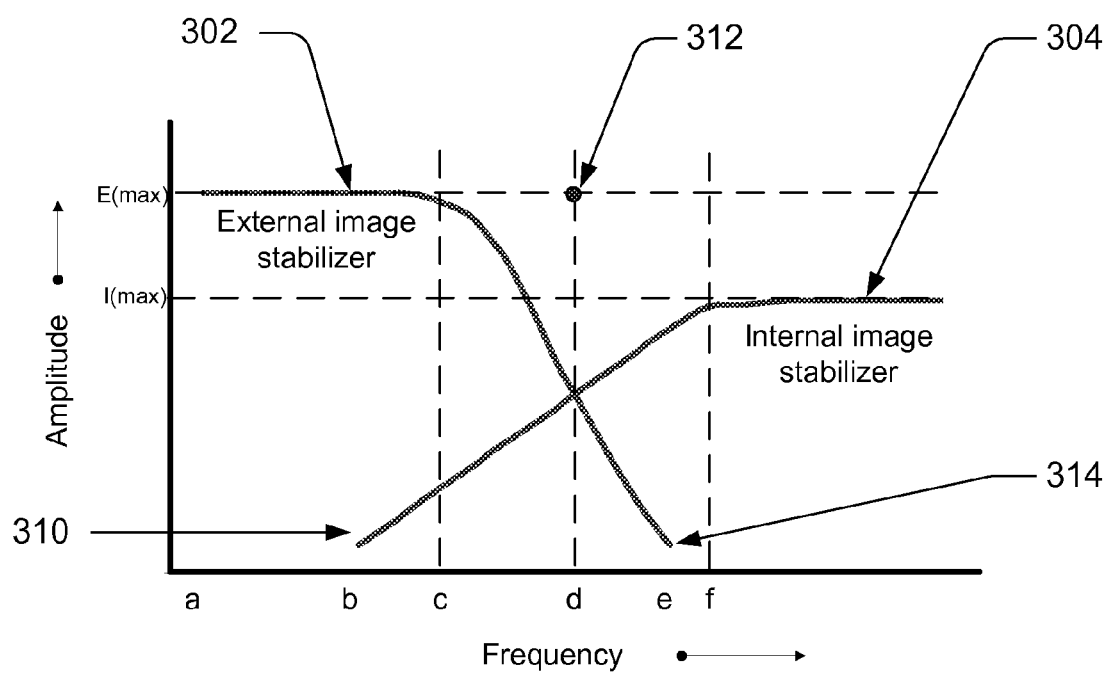
FIG. 3 is a chart illustrating amplitude and frequency responses for a dual stabilization device on a video camera in accordance with an embodiment of the invention.

FIG. 3 is a chart 300 illustrating predicted amplitude and frequency responses for a dual loop stabilization device on a video camera in accordance with an embodiment of the invention. The chart 300 depicts general attributes of apparatus or methods of providing a dual loop stabilization of a video camera image, however it will be appreciated that variations of the chart may exist while still remaining within the spirit and scope of the present invention. A first line 302 on the chart 300 represents an external stabilization capability of the image stabilization apparatus or system. A second line 304 represents an internal stabilization capability of the image stabilization apparatus or system. Both lines are plotted with respect to frequency (x-axis) and amplitude (y-axis) of movement of the video camera.

Between points a and b, the video camera is only subjected to high amplitude, low frequency movement. In this range, only the first line 302 representing the stabilization of the external stabilizer will have a stabilizing affect on the video camera movement. No low frequency movement exists in this range for the internal stabilizer to eliminate until point b is reached. Between points b and c, the internal stabilizer begins to effectively stabilize low amplitude movement of the video camera while working in conjunction with the external stabilizer. In the range between points c and d, the effectiveness of the external stabilizer to stabilize amplitude decreases as the frequency increases. Point d is the intersection of the two lines 302, 304, and the point where primary stabilization shifts from the external stabilizer to the internal stabilizer. A displayed video image of a video camera subjected to a movement 312 with an amplitude of E(max) and frequency of d will be unstable because the movement of the video camera is outside of the range of stabilization of both the first line 302 (external stabilizer) and the second line 304 (internal image stabilizer). Therefore, a video image subjected to movement 312 may cause some viewers to experience motion sickness.

At point e, the external stabilization device is no longer effective 314 to stabilize movement of the video camera because of the high frequency movement of the video camera, thus only the internal stabilizer will have any stabilization affect. At point f, the internal stabilization device has reached its maximum capacity for stabilizing the movement amplitude at point I(max), therefore any movement with an amplitude greater than I(max) and a frequency greater than f would be unstable and may cause at least some viewers to experience motion sickness when displayed images are viewed.

Generally, the properties of the external stabilizer (first line 302) will allow stabilization of higher amplitude movement of a video camera than the internal stabilizer (second line 304), while the internal stabilizer will allow stabilization of higher frequency movement of the video camera than the external stabilizer. Therefore, E(max) is typically greater than I(max) with regard to amplitude stabilization, while b is typically less than f with regard to frequency stabilization.

Figure 4:
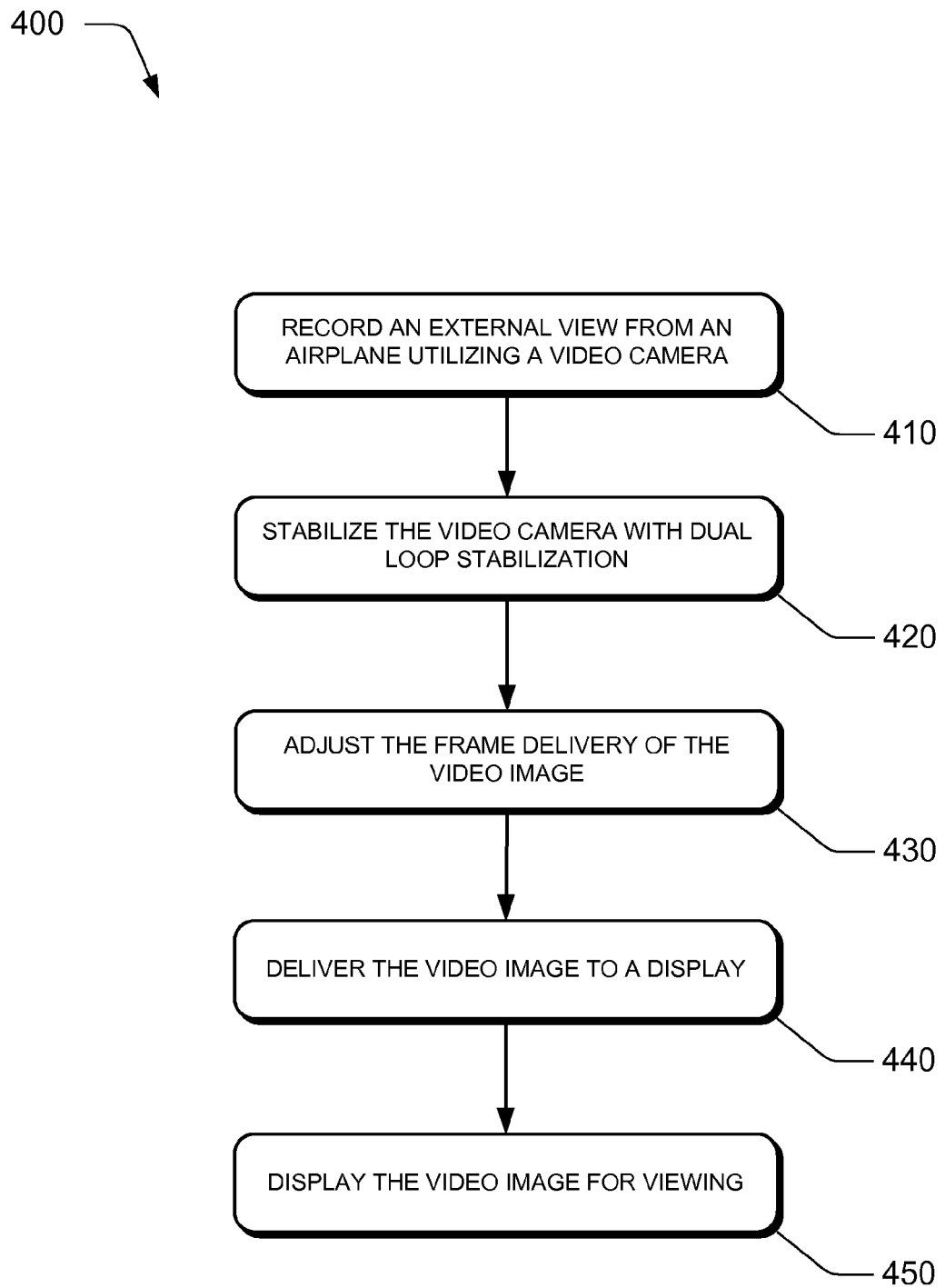
FIG. 4 is a flow chart of a method of dual loop stabilization for a video camera image in accordance with an embodiment of the invention.

FIG. 4 is a flow chart of a method 400 of dual loop stabilization for a video camera image in accordance with an embodiment of the invention. At block 410, a video camera records an external view from an aircraft or other suitable platform. At block 420, a video camera is stabilized with dual loop stabilization. The stabilization includes both internal and external stabilization devices and systems. At block 430, a frame delivery of the video image is adjusted. A video processor may be utilized to adjust the frame delivery, including frame addition or subtraction, or electronic frame movement of the picture elements. For example, when a video camera records at 30 Hz, there at 30 frames recorded by the video camera each second. Of these 30 frames, some of them may contain unstable images such that when displayed in a sequence, these unstable frames appear to jump around or jitter on a display screen. Therefore, at block 430, these undesirable frames may be removed, the images cropped or reduced in resolution, or the frame delivery rate may be reduced, such as to 20 Hz, to create the appearance of a more stable video image. Additionally, the unstable frames may be replaced with previously delivered stable frames.

At block 440, a video image is delivered to a video display. The video display may be within the aircraft (or platform) on which the video camera is mounted, or alternately it may be external to the aircraft. In some embodiments, the video image may be delivered to a display positioned for passenger viewing within the aircraft. At block 450, the video image is displayed for viewing.

Figure 5:
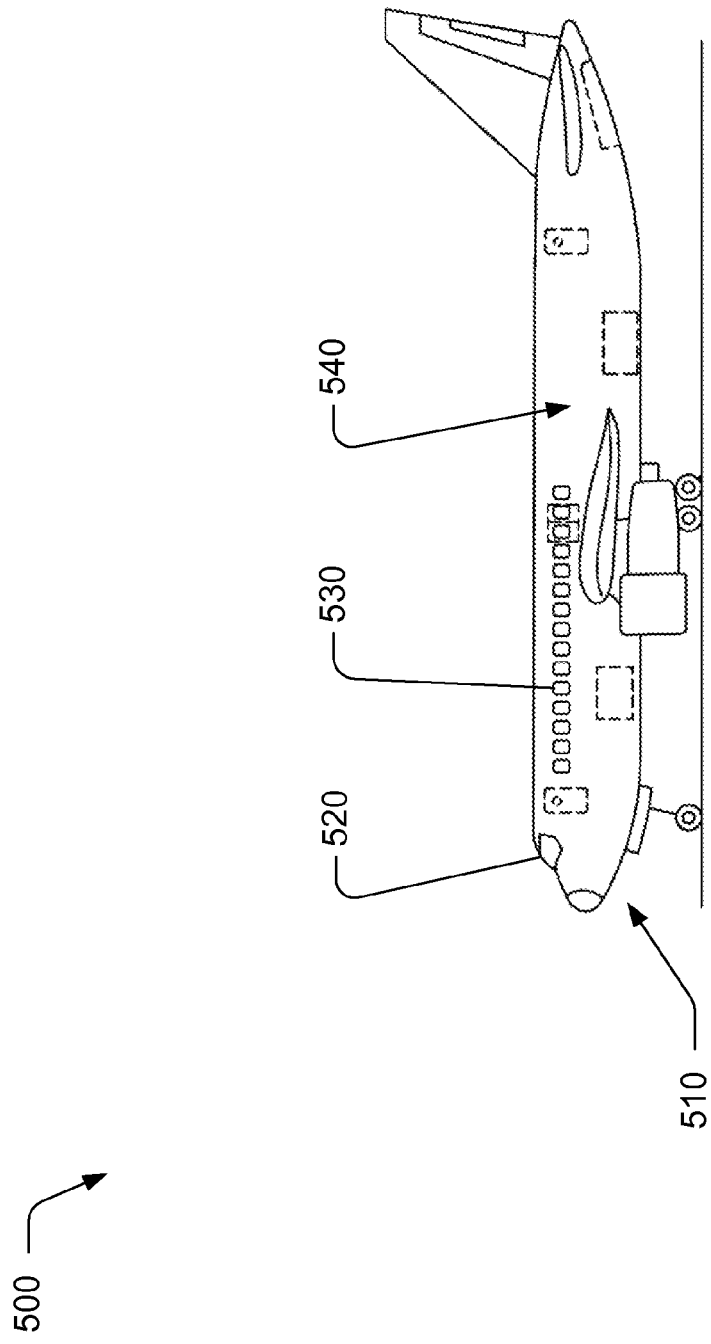
FIG. 5 is a side elevational view of an airplane that may include a dual loop stabilization video camera apparatus in accordance with another embodiment of the invention.

FIG. 5 is a side elevational view of an airplane 510 that includes a dual loop stabilization video camera apparatus in accordance with an embodiment of the invention. The airplane 510 in environment 500 may be of any type of aircraft. For example, it may be a commercial airline, cargo plane, or small passenger plane. The airplane 510 may have a number of external windows 530, including a cockpit window 520, which allow passengers and crew to see outside of the aircraft 510. Additionally, the airplane may include window-free sections 540. In locations where no windows are present, such as in section 540, it may be advantageous to position a video camera to record the external view for passengers and crew seated or working in this area. For example, one or more embodiments of dual loop stabilization video cameras may be advantageously positioned to record the external view of the aircraft and project a display of images that result in substantially the same view as a person would have if an external window was present in section 540. In another embodiment, the embodiments of the invention may be advantageous on existing airplanes which do not have many passenger windows or have no passenger windows, such as cargo airplanes and blended wing aircraft.

Figure 6:
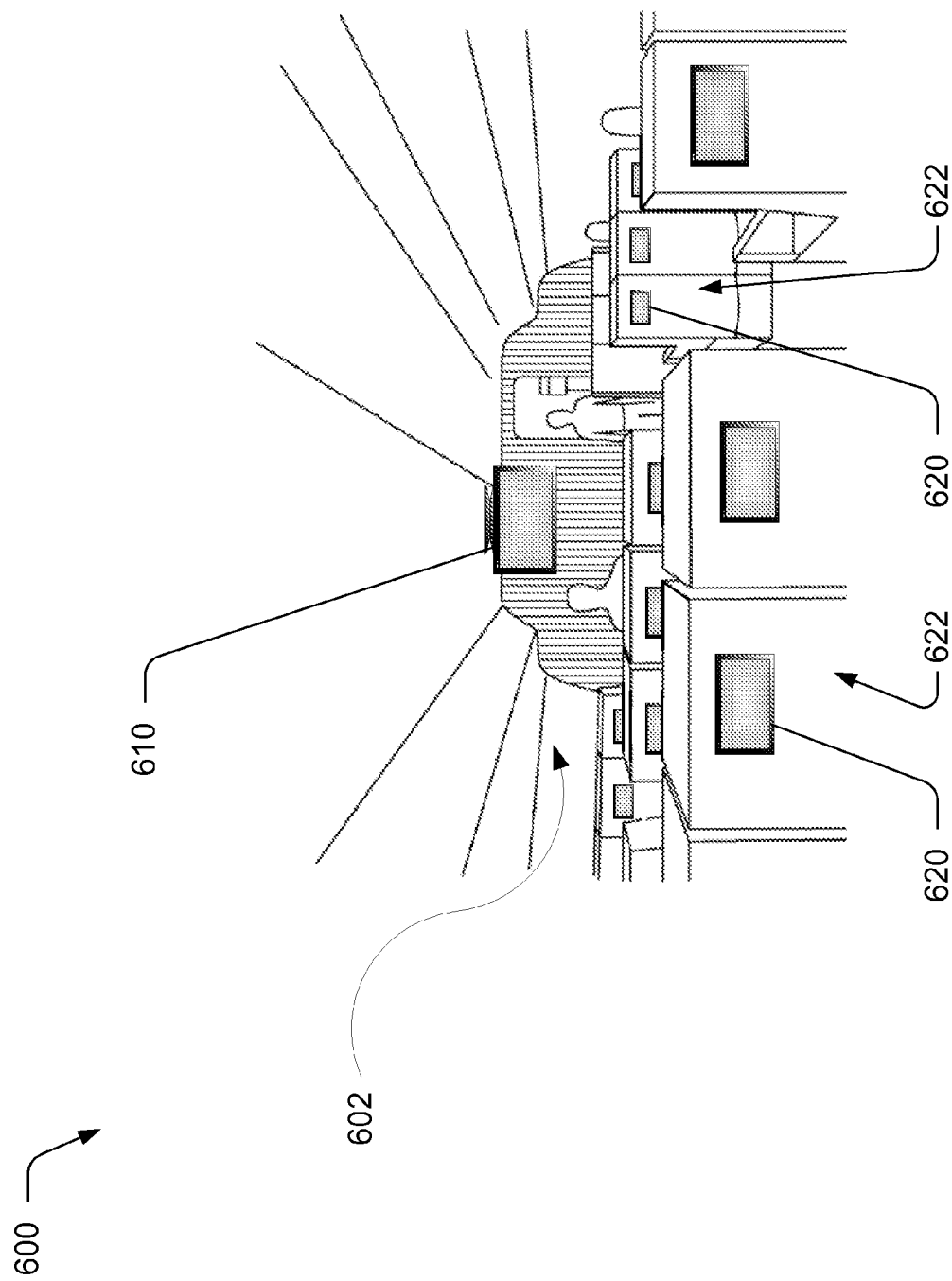
FIG. 6 is a rear elevational view of a passenger compartment inside of the airplane of FIG. 5 where a dual loop stabilization video camera display may be utilized in accordance with an embodiment of the invention.

FIG. 6 is a rear elevational view of an environment 600 within the windowless portion 540 of the passenger compartment inside of the airplane 510 of FIG. 5, where a dual loop stabilization video camera display may be utilized in accordance with an embodiment of the invention. In environment 600, an inside 602 of the airplane 510 contains a number of passenger seats 622 arranged in rows and aisles. The dual loop stabilization video camera display may be positioned in a number of locations within the aircraft 510.

In some airplanes, an overhead display 610 may be utilized to display the video camera image. Further, smaller seat displays 620 may be integrated with the passenger seats 622 to provide passengers with individual display sources. Fold out displays (not shown) or other small displays may be integrated into other internal structures or portions within the airplane such as to accommodate passengers in front-of-the-aisle seats, which do not have a seat display in front of them, or in first class seats and other desirable locations. Displays may also be positioned on other suitable interior surfaces of the airplane 510. For example, displays may be integrated into the sidewalls of the aircraft, such as where windows 530 (FIG. 5) would normally be located. Displays may also be positioned in other areas, such as in lavatories, the cockpit, lounge areas, or in flight attendant and service crew areas of the airplane. The displays may be utilized by passengers, the crew of an airplane, or both. Further, a combination of the display locations and types of displays discussed above may be combined to offer displays viewable to anyone inside of the airplane.

Furthermore, one or more video cameras may be utilized on the airplane. In one embodiment, two video cameras may be utilized with one video camera positioned on each side of the airplane, enabling a window-like view to be displayed on the internal displays which simulate an external window view from either side of the airplane. For example, a first video camera may be positioned on the right side of the airplane to capture a view away from, and perpendicular to, the fuselage of the airplane while a second video camera may be positioned on the left side of the airplane in a corresponding position. In other embodiments, more video cameras may be utilized on the plane, such as a third video camera positioned to record the viewpoint of the pilot facing in the forward direction of the plane.

The displays may be dedicated to a view from a single video camera, or they may allow a user to select a video camera feed from any one of the video cameras utilized on the airplane (e.g., first, second, or third video camera). For example, a passenger may toggle between the video cameras in order to see the various geographic attractions a pilot may mention during a flight. In one situation, a passenger seated on the right side of the airplane may select a left side video camera (e.g., second video camera) view when the airplane flies near a ground attraction which is viewable from the left side of the airplane, thus enabling the passenger to view the geographic attraction without looking at a different video display or leaving his or her seat.

In still further embodiments, the display that receives images from an image-capturing assembly in accordance with the teachings of the present disclosure may be positioned at a location remote from the platform upon which the image-capturing assembly is located. For example, in some embodiments, the image-capturing assembly in accordance with the invention may be located on a first platform (manned or unmanned), such as an Unmanned Aerial Vehicle (UAV), a submersible vehicle, a space vehicle, or a ground vehicle, and the display that receives images from the image-capturing assembly may be positioned remotely at a distal location, such as at a remote ground-based location, sea-based location, space-based location, or air-based location. In a particular embodiment, the image-capturing assembly may be positioned on a UAV platform, and the display may be positioned on a command aircraft.

Figure 7:
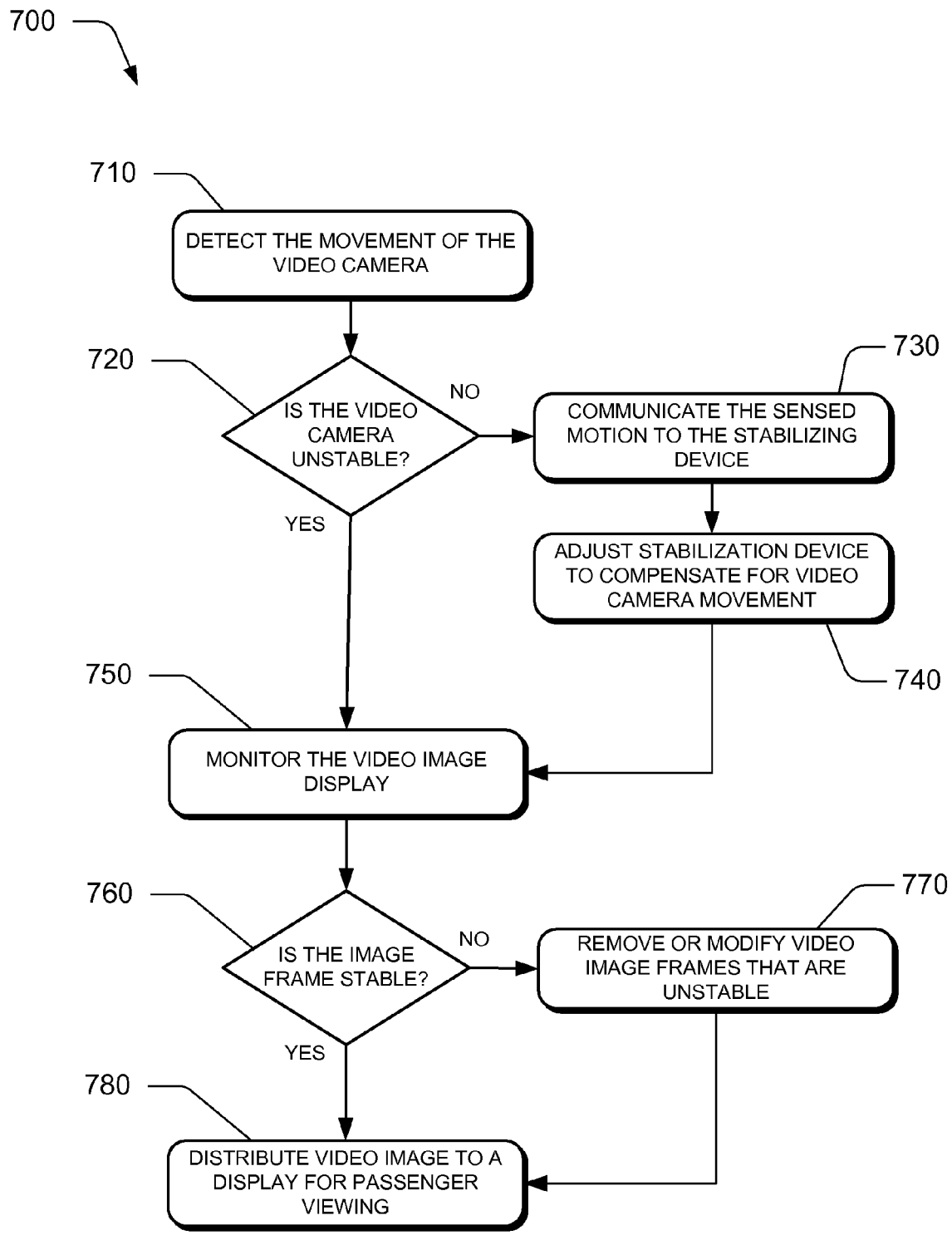
FIG. 7 is a flow chart of a method of dual loop stabilization for a video camera image in accordance with another embodiment of the invention.

FIG. 7 is a flow chart of a method 700 of dual loop stabilization for a video camera image in accordance with another embodiment of the invention. At block 710, a movement of the video camera is detected. The movement may be from air turbulence, vibration, or other types of movement of the platform upon which the video camera is mounted. At decision block 720, video camera stability is determined. If the video camera is unstable (i.e., it is experiencing movement), at block 730, a sensed movement is communicated to one or more stabilizing devices. The stabilizing devices may be the external image stabilizing apparatus or system described above (FIGS. 1 and 2, element 110). At block 740, the one or more stabilization devices are adjusted to compensate for the movement of the video camera. For example, dampening members (FIGS. 1 and 2, element 114) may adjust to a softer setting to allow for absorption of larger amplitude movements, while potentially compromising the stability response to higher frequency movements of the video camera.

At block 750, a video image display is monitored by a processor in communication with the dual loop stabilization system. The processor may be integrated in the video camera or may be an external component. At block 760, a processor determines if the image frame is stable. If the frame is unstable (e.g., it is jittering), at block 770, an unstable video image frame may be removed or modified, such as by cropping or reducing the resolution of the frame. The processor may also ensure the frame deliver rate remains high enough in order to depict smooth and continuous video motion, such as at least a frame rate of 15 Hz. At block 780, a video image is distributed to a display, including, for example, to a passenger for viewing. The image may be substantially stable. In some embodiments, where the platform is an airplane and the display is located within the airplane for passenger viewing, the image will be suitably stable so as to not cause a viewer to experience motion sickness when the airplane experiences turbulence or other movement common during a typical flight of an airplane.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An apparatus for providing video images using dual loop image stabilization, comprising:
   a video camera positioned on a moveable platform and configured to provide a video image of a scene, the video camera including an internal image stability control device configured to at least partially stabilize the video image when the video camera is subjected to a first motion environment including a first amplitude range and a first frequency range;
   at least one external image stability control device coupled between the video camera and the moveable platform and configured to apply an opposing force along an axis in response to the video camera being subjected to a force in a linear direction along the axis in a second motion environment including a second amplitude range and a second frequency range, wherein the at least one external image stability control device includes a biasing member and a dampening member mounted approximately parallel to the axis, and wherein the biasing member and the dampening member operate in parallel to apply the opposing force along the axis; and
   a motion sensing device coupled to the video camera and configured to detect movement of the video camera relative to the scene and to transmit a control signal to the at least one external image stability control device to adjust a stabilization response of the at least one external image stability control device according to the movement of the video camera.

2. The apparatus of claim 1, wherein the internal first image stability control device includes digital image stabilization.

3. The apparatus of claim 1, wherein the motion sensing device includes a gyro, and at least one of the biasing member and dampening member is controlled by the control signal from the motion sensing device.

4. The apparatus of claim 1, wherein at least one of the biasing member and the dampening member includes an electromechanical component.

5. The apparatus of claim 1, wherein the moveable platform comprises an aircraft, and wherein the video camera includes a wide angle lens configured to capture at least part of an environment surrounding the aircraft.

6. The apparatus of claim 1, wherein the first amplitude range of the first motion environment is at least partially lower than the second amplitude range of the second motion environment, and wherein the first frequency range of the first motion environment is at least partially higher than the second frequency range of the second motion environment.

7. The apparatus of claim 1, wherein the internal and external image stability control devices are mechanical devices configured to stabilize an image captured by the video camera.

8. The apparatus of claim 1, wherein said at least one external image stability control device comprises:
   a first external image stability control device having a biasing member and a dampening member mounted approximately parallel to a z-axis (yaw); and
   a second external image stability control device having a biasing member and a dampening member mounted approximately parallel to a y-axis (pitch),
   wherein the z-axis (yaw) and the y-axis (pitch) are aligned with a direction of movement of the video camera having a line of sight substantially aligned along an x-axis.

9. A method of providing a video image from a moveable platform, comprising:
   capturing a first video image of a first view from the moveable platform using a first video camera; and
   capturing a second video image of a second view from the moveable platform using a second video camera;
   stabilizing the first video image and the second video image using wherein first and second stabilization devices are associated with each of the first video camera and the second video camera, wherein the first and second stabilization devices are configured to reduce an adverse effect of one or more movements of the moveable platform on the first video image and the second video image wherein the first stabilization device includes a stability control device coupled between the first video camera and the moveable platform and configured to apply an opposing force along an axis in response to the video camera being subjected to a force in a linear direction along the axis, and wherein the stability control device includes a biasing member and a dampening member mounted approximately parallel to the axis, and wherein the biasing member and the dampening member operate in parallel to apply the opposing force along the axis;

adjusting a frame delivery of at least one of the first video image and the second video image to at least partially improve stabilization of the first video image and the second video image;

enabling a user to select the video image to be viewed, wherein the video image includes at least one of the first video image and the second video image; and delivering the selected video image to a video display.

10. The method of claim 9, wherein adjusting frame delivery of at least one of the first video image and the second video image includes removing unstable frames from a sequence of frames prior to delivering the selected video image to the video display.

11. The method of claim 9, wherein adjusting the frame delivery of the selected video image includes at least one of:
cropping the selected video image;
reducing resolution of the selected video image; and
replacing an unstable selected video image with a stable selected video image.

12. The method of claim 9, wherein the first stabilization device is configured to at least partially stabilize the first video images and the second video images when the first video camera and the second video camera are subjected to a first motion environment including a first amplitude range and a first frequency range, and wherein the second stabilization device is configured to at least partially stabilize the first video image and the second video image when the first video camera and the second video camera are subjected to a second motion environment including a second amplitude range and a second frequency range, wherein the first amplitude range is at least partially lower than the second amplitude range, and wherein the first frequency range is at least partially higher than the second frequency range.

13. The method of claim 9, wherein:
the second stabilization device associated with the first video camera includes a first sensing device configured in the first video camera to detect movement of the first video camera, wherein the second stabilization device associated with the first video camera receives a first signal from the first sensing device to make adjustments to stabilize the movements of the first video camera; and
the second stabilization device associated with the second video camera includes a second sensing device configured in the second video camera to detect movement of the second video camera, wherein the second stabilization device associated with the second video camera receives a second signal from the second sensing device to make adjustments to stabilize the movements of the second video camera.

14. The method of claim 9, wherein delivering the video image to the video display includes delivering the selected video image to a video display device disposed on a back of a passenger seat within the moveable platform, wherein the first view captured by the first video camera is captured from a first side of the moveable platform and the second view captured by the second video camera is captured from a second side of the moveable platform.

15. A method of stabilizing a video image before delivery of the video image to a viewer, comprising:
stabilizing a video image by use of internal video camera controls;
sensing a motion of a video camera;
communicating a control signal representative of the sensed motion to one or more external mechanical video camera controls, wherein the control signal is configured to cause the external mechanical video camera controls to reduce an effect of the sensed motion on the video image;
stabilizing the video image via the external mechanical video camera controls by mounting, the video camera to a moveable platform with a biasing member and a dampening member that are mounted approximately parallel to an axis of the moveable platform, and wherein the biasing member and the dampening member operate in parallel to apply the opposing force along the axis;
changing a frame rate of the video image by removing at least one frame of a plurality of frames in the video image, wherein the at least one frame is perceived as unstable in relation to adjacent frames of the video image; and
distributing the video image to the viewer.

16. The method of claim 15, wherein sensing a motion of a video camera includes receiving information from a gyro integrated with the video camera.

17. The method of claim 15, wherein stabilizing a video image by use of internal controls includes digital stabilization.

18. The method of claim 15, further comprising adjusting a frame resolution to a lower resolution for the at least one frame perceived as unstable in relation to the adjacent frames of the video image.

19. The method of claim 15, wherein the distributed video image depicts an environment external of an aircraft, wherein the video image is captured by a wide angle lens.

20. The method of claim 15, wherein
stabilizing a video image by use of internal mechanical video camera controls includes stabilizing the video image by use of internal mechanical video camera controls when the video camera is subjected to a first motion environment including a first amplitude range and a first frequency range;
and wherein stabilizing the video image via external mechanical video camera controls includes stabilizing the video image via the external mechanical video camera controls when the video camera is subjected to a second motion environment including a second amplitude range and a second frequency range;
and wherein the first amplitude range is at least partially lower than the second amplitude range, and wherein the first frequency range is at least partially higher than the second frequency range.

* * * * *

UNITED STATES PATENT AND TRADEMARK OFFICE
CERTIFICATE OF CORRECTION

PATENT NO.       : 7,643,063 B2                                          Page 1 of 1
APPLICATION NO. : 11/618660
DATED            : January 5, 2010
INVENTOR(S)      : Patrick J. Trescott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Sixteenth Day of November, 2010

David J. Kappos
*Director of the United States Patent and Trademark Office*